(12) United States Patent
Liaw et al.

(10) Patent No.: US 8,575,265 B2
(45) Date of Patent: Nov. 5, 2013

(54) POLYMERIZATION METHOD FOR ACRYLIC LATEX WITHOUT EMULISIFIER

(75) Inventors: Der-Jang Liaw, Tai-Chung (TW);
Chih-Kuang Hu, Tai-Chung (TW);
Chih-Wei Chang, Tai-Chung (TW)

(73) Assignee: Champward Chemical Industrial Co., Ltd., Tai-Chung (TW)

( * ) Notice: Subject to any disclaimer, the term of this patent is extended or adjusted under 35 U.S.C. 154(b) by 188 days.

(21) Appl. No.: 13/067,902

(22) Filed: Jul. 6, 2011

(65) Prior Publication Data
US 2012/0095163 A1 Apr. 19, 2012

(30) Foreign Application Priority Data
Oct. 15, 2010 (TW) ................................ 99135164 A (51) Int. Cl.
*C08F 220/18* (2006.01)
(52) U.S. Cl.
USPC ........................................ 524/833; 524/819
(58) Field of Classification Search
USPC ................................................ 524/833, 819
See application file for complete search history.

(56) References Cited

U.S. PATENT DOCUMENTS

| | | | | |
|---|---|---|---|---|
| 5,342,878 A | * | 8/1994 | Das et al. | 524/558 |
| 5,641,829 A | * | 6/1997 | Das et al. | 524/507 |
| 6,872,789 B2 | * | 3/2005 | Brinkhuis et al. | 526/89 |
| 2007/0100069 A1 | * | 5/2007 | Chen et al. | 524/817 |
| 2007/0116660 A1 | * | 5/2007 | Kim et al. | 424/70.16 |

FOREIGN PATENT DOCUMENTS

WO WO 2012/082141 * 6/2012

* cited by examiner

*Primary Examiner* — Liam Heincer
*Assistant Examiner* — Michael A Salvitti
(74) *Attorney, Agent, or Firm* — Bacon & Thomas, PLLC (57) ABSTRACT

The present invention provides a polymerization method for acrylic latex without emulsifier, in which a reaction system is formed from 40~60 wt % of pure water and 2~9 wt % of carboxylic acid monomers with carbon-carbon double bond polymerizable functional groups (A), and 40~50 wt % of methyl methacrylate or acrylate monomers (B), and 0.2~2.0 wt % of inorganic alkaline solution is first used to adjust the pH value of the reaction system to within a pH range of 9.0~13.0, then 0.2~1.0 wt % of peroxide sulfates are used as initiators, and emulsification polymerization is carried out. At the end of the reaction, organic amine compounds are used to adjust the pH value of the obtained aqueous resin latex to within the pH range 7.0~9.5. Particle diameters of the manufactured aqueous resin latex are approximately 100~30 nm, uniformly distributed and have excellent outward appearance. Moreover, acid value is low at 3.5~6.5 mgKOH/g, and Its specific gravity is approximately 1.07, slightly greater than that of water; storage stability is excellent, with good permeability that facilitates construction. Moreover, water resisting property as a dry film coating is good, tensile strength is excellent, and provides superior abrasion performance.

4 Claims, 2 Drawing Sheets

POLYMERIZATION METHOD FOR ACRYLIC LATEX WITHOUT EMULISIFIER

BACKGROUND OF THE INVENTION (a) Field of the Invention

The present invention relates to a polymerization method for aqueous acrylic latex, and more particularly to a polymerization method for acrylic latex without emulsifier which enables providing a water dispersible acrylic latex that is environmentally friendly and non-polluting, in which particle diameters of the resin latex are small and uniformly distributed with excellent outward appearance; its specific gravity is slightly greater than water, and has low acid value, superior storage stability, with good permeability that facilitates construction. Moreover, water resisting property as a dry film coating is good, tensile strength is excellent, and provides superior abrasion performance.

(b) Description of the Prior Art

Traditionally, preparation of acrylic latex comprises acrylic acid monomers in an aqueous solution, upon which emulsification polymerization reaction is carried out using low molecular weight emulsifiers, and under the effect of emulsifiers, mechanical stirring and an initiator causes the monomers in the water or other solvent to disperse and form an emulsion for free radical polymerization to be carried out thereon. However, if manufacture of a solid polymer is required, a multiple step procedure involving emulsion breaking, washing, dehydration, drying must be carried out, resulting in high production cost. Moreover, impurities, such as emulsifiers, in the obtained polymer product are difficult to clean out, and affect electrical properties, and thus unsuitable for use.

When drying the obtained emulsion, the emulsifiers easily exude out from within the polymer, thereby contaminating the surface of the acrylic latex and reducing the bonding strength thereof between other materials, and thus not suitable for use.

In order to solve the problem brought about by participation of the emulsifier in the emulsification polymerization reaction, patent document 1 (Japanese Patent Publication No. 2006-206907) describes using non-ionic surface active agents, including polyethylene glycol octyl phenyl ether, polyethylene glycol nonyl phenyl ether, and polyethylene glycol decyl phenyl ether, to synthesize acrylic latex. And although facilitating in preventing environmental pollution, however, such environmental hormone compounds are harmful to the human body, and thus limits use thereof.

In general, when carrying out emulsification polymerization, solubility of the monomers in aqueous phase is relatively small, thus the monomer droplets do not easily migrate to micelles, and organic solvents such as acetone or isopropyl alcohol must be added to assist solubilization. Some people have tried adding co-emulsifiers, and stirring at high speed to cause the monomers to disperse in the water and become micron sized monomer droplets to serve as the primary polymerization site. Such so-called fine emulsion polymerization is used to solve the problem of the difficulty in dissolving the monomers.

The aforementioned fine emulsion polymerization method provides a relatively good solution to the problem of the difficulty in dissolving the monomers, while some people use solvent-soluble initiators to initiate direct polymerization of the monomers in the monomer droplets. The process of the monomer droplets migrating to micelles is not necessary, and the droplets are able to directly form cores, thereby avoiding the problem of indissolubility of the monomers.

Some people use a compound emulsifier composed of ionic surface active agents and long chain aliphatic alcohols or long chain alkanes to cause monomers in a fine emulsion to form stable nanometer droplets (30~500 nm). Because the ionic surface active agents and the compound emulsifiers produce osmotic pressure that neutralizes the pressure difference between large and small monomer droplets, and reduces monomer diffusion between different sized droplets, thus, stability of the small droplets is greatly increased, thereby enabling the fine emulsion to obtain sufficient dynamic stability. Accordingly, water and solvent, surface active agents and adjuvants are able to spontaneously form thermodynamically stable emulsion.

However, during the polymerization process, variations in the water, solvent, emulsifier and adjuvant emulsifier of the system composition, or polymerization reaction temperature, hydrophilic or oleophilic groups can cause the surface active agent molecules in the solution and the produced micelles to mutually transform into three types of structures including oil in water O/W, water in oil W/O and bicontinue B.C, and form polymer microemulsion with small average particle diameter, low surface tension, greatly strengthened wettability and permeability and better stability.

Patent documentation 2 (Japanese Patent Publication No. 07-331208) points out that in the presence of a polymeric emulsifier composed of reactive emulsifiers (A), and styrenes and/or alkyl (meth)acrylates (B) and acrylic acid and/or methacrylic acid anionic monomers (C) as the primary constituents, emulsifying tackifier resin enables obtaining tackifier resin latex; and polymer emulsion containing acrylic esters and/or latex for adhesive use enables obtaining aqueous adhesive constituents.

However, the aforementioned reactive emulsifier (A) refers to use proportion of carbon-carbon double bonded surface active agents having hydrophilic groups and hydrophobic groups in-molecule reaching as high as 10~50 wt % of the composed monomer composition. Moreover, the tackifier resin must participate in the reaction.

Hence, the trend for avoiding the problems brought about participation of the emulsifier in the reaction lies in the emulsion polymerization process adding no emulsifier whatsoever or only the addition of a trace amount of emulsifier (concentration of which is less than the critical micelle concentration CMC) during the reaction process or a portion of the obtained polymers being provided with polymeric emulsifier characteristics. This being non-soap emulsion polymerization without the addition of conventional emulsifiers, enabling obtaining a clean surface, and monodispersed latex particles, while at the same time avoiding the use of emulsifiers which affect the environment.

In addition, patent documentation 1 points out that when synthesizing acrylic latex, water-soluble tackifying resin is used without the use of emulsifiers to carry out emulsion polymerization, thereby enabling the freezing stability of acrylic latex to be increased, as well as enabling reuse when thawed after freezing, thus completely satisfying such physical properties using a one-time synthesis. Although achieving the effectiveness of shortening the procedure, however, because the tackifying resin used is water-soluble, the obtained latex film is deficient in water resistance, and thus not suitable for coating purposes.

In order to solve the problem of water resistance, measures should be taken regarding stability of the latex colloidal particles related to the amount of electrolyte and other low molecules contained in the latex film. The stability of the latex colloidal particles is primarily determined by surface-active oligomers, and the larger the surface charge concentration of the latex colloidal particles, the better the stability. Surface stability of the colloidal particles is still determined by hydrophilicity of the particle surfaces of the latex colloidal particles, and the greater the hydrophilicity, the better the stability. Accordingly, because polarity of the latex colloidal particles causes interaction between the particle surfaces and the aqueous phase interface and reduces Gibbs free energy at the interface, thus, an increase in particle stability of the latex colloidal particles results.

Hence, the issues of the present invention urgently awaiting to be solved are avoiding the problems of contamination brought about by using non-ionic surface active agents and coemulsifiers resolving the difficulty in dissolving monomers, and implements non-soap emulsion polymerization without the addition of conventional emulsifiers, which increases stability of small droplets during emulsification, while surface active oligomers increase the stability of the latex colloidal particles. Moreover, latex monodispersed particles are obtained with clean surfaces, while at the same time avoiding the use of emulsifiers which affect the environment,

SUMMARY OF THE INVENTION

In the light of the aforementioned issues urgently awaiting to be resolved, the objective of the present invention lies in synthesizing a polymer microemulsion having uniform average particle diameter, very strong wettability and permeability, and superior stability.

The inventor of the present invention has discovered from meticulous examination and review of research results that a reaction formed from 40~60 wt % of pure water, 2~9 wt % of carboxylic acid monomer with carbon-carbon double bond polymerizable functional groups (A), and 40~50 wt % of methacrylate alkane or acrylate alkane monomer B as the main constituents, without using organic solvents or cosolvents or amphiprotic solvents, in which 0.2~2.0 wt % of inorganic alkaline solution is first used to adjust the reaction to an appropriate pH value range (pH 9.0~13.0 being preferred, and 11.0~13.0 is more preferred) and then an initiator is added to initiate an emulsification polymerization reaction without emulsifier. In the final part of the reaction the appropriate amount of pH regulating organic amines is added to adjust the pH to within the range 7.0~9.5 (8.0~9.0 being preferred), thereby manufacturing an ultra-thin polymer emulsion of uniformly distributed particles having a diameter of 100~130 nm, and completing the present invention, providing a water dispersible acrylic latex that is environmentally friendly and non-polluting, and particle diameters of the resin latex are small and uniformly distributed with excellent outward appearance. Specific gravity is slightly greater than water, has low acid value, superior storage stability, and good permeability that facilitates construction. Its water resisting property as a dry film coating is good, tensile strength is excellent, and provides superior abrasion performance.

During emulsion polymerization, the present invention uses carboxylic acid monomer with carbon-carbon double bond polymerizable functional groups in water, and acrylic acid monomer inorganic base solution is used to dissolve the carboxylic acid monomer with carbon-carbon double bond polymerizable functional groups and form an alkaline aqueous solution, thereby causing hydrophilic ion radicals to form on the end groups of the polymer molecular chain (oleophilic). Moreover, peroxide sulfates are used as initiators to cause surfaces of the microspheres to form charged layers which are able to stabilize the latex.

In general, solubility of acrylic acid monomers in aqueous phase used in emulsification methods is too small, and the monomer droplets do not easily migrate to micelles. Moreover, it is relatively difficult to obtain stable acrylic latex using traditional emulsion polymerization methods, and commonly used industrial organic solvents (such as acetone or isopropyl alcohol) must be added to increase solubilization. The present invention, taking into consideration the film coating properties of the aqueous acrylic latex obtained, does not use organic solvents.

Regarding the initiators used by the present invention, although one type or more than one type selected and formed from a group of peroxides including conventional benzoyl peroxide (BPO), azodiisobutyronitrile (AIBN), sodium persulfate, ammonium persulfate, potassium persulfate, and hydrogen peroxide can be used to serve as the initiator to effect initialization, however, in the present invention it is preferred to use peroxide sulfates, such as sodium persulfate (hereinafter referred to as $Na_2S_2O_8$), potassium persulfate (hereinafter referred to as $K_2S_2O_8$), and ammonium persulfate (hereinafter referred to as $(NH_4)_2S_2O_8$).

The initiator initiates polymerization of the monomer molecules in water, and chain growth rate is relatively fast. When the molecular weight of the generated polymers reaches a certain critical value, that is precipitates out from the aqueous phase, then the initial latex particles are formed. Because the surface charge concentration of these particles is relatively low, thus, the static electricity repulsive force between the particles is insufficient, and enables the particles to be stable, thereby enabling mutual aggregation until stable latex particles are produced. In the polymer molecular chains (oleophilic) and the ion radicals (hydrophilic) on the end groups, the generated esters are provided with anionic emulsifier characteristics-hydrophilic containing oleophilic groups, and achieves emulsification effectiveness without emulsifier, thereby causing the polymer esters obtained from polymerization to be provided with the characteristics of an anionic emulsifier, and achieving emulsification effectiveness that enables emulsion polymerization to be carried out without emulsifier.

The methods used in the present invention involves adding inorganic bases, which cause the monomers participating in the emulsification polymerization reaction to produce polar groups, and the surfaces of the microspheres to form charged layers, thereby stabilizing the emulsion and causing the surfaces of the obtained latex colloidal particles to be provided with hydrophilic groups, which can replace traditional emulsifiers.

No emulsifier whatsoever is added during the reaction process, and (methyl) alkyl acrylate (B) and carboxylic acid monomer with carbon-carbon double bond polymerizable functional groups (A) are used as the major constituents to carry out the emulsification polymerization, which enables a portion of the polymers obtained to be provided with the characteristics of high polymer emulsifier. At the end of the reaction, organic amines are selected and used to adjust the pH value of the obtained aqueous resin latex to within the pH range of 7.0~9.5, and the acid value of the obtained aqueous resin latex to lower than 3.5~6.5 mgKOH/g. Furthermore, when carrying out emulsification without emulsifier, hydrophilic ion radicals are caused to form on the end groups of the oleophilic polymer molecular chains, and the charged layers formed on the surfaces of the microspheres of the obtained latex colloidal particles stabilize the emulsion.

In the present invention, although one type or more than one type selected and formed from a group of inorganic bases including sodium hydroxide, potassium hydroxide, calcium hydroxide, sodium carbonate, potassium carbonate, calcium hydride, sodium hydride, potassium hydride, and trisodium phosphate can be used, however, it is preferred that one type or more than one type from the inorganic bases including sodium hydroxide, potassium hydroxide, trisodium phosphate is used. These inorganic bases cause the reactive carboxylic acid monomers with carbon-carbon double bond polymerizable functional groups to have high hydrophilic properties and anion characteristics within a broad pH range, and enable hydrophilic ion radicals to form on the end groups of the oleophilic polymer molecular chains, as a result of which charged layers are formed on the surfaces of the microspheres of the obtained latex colloidal particles, thereby stabilizing the emulsion.

In the present invention, examples of the carboxylic acid monomers with carbon-carbon double bond polymerizable functional groups in water include monocarboxylic acids such as acrylic acid, methacrylate, crotonic acid (butenic acid), or dicarboxylic carboxylic acids such as maleic acid, maleic anhydride, fumaric acid, itaconic acid, and muconic acid (2,4-muconic acid). Peroxide sulfates are used as initiators, and inorganic bases are used to dissolve the carboxylic acid monomers to obtain high polymer hydrophilic resin. A portion of the produced polymers is provided with high polymer emulsifier characteristics, which can replace conventional surface-active agents. No emulsifier whatsoever is added during the reaction, thereby enabling emulsification polymerization of the carboxylic acid monomers in water to be carried out without emulsifier, causing hydrophilic ion radicals to form on the oleophilic end groups of the polymer molecular chains, and charged layers formed on the surfaces of the microspheres stabilize the emulsion.

The carboxylic acid monomers with carbon-carbon double bond polymerizable functional groups (A) used in the present invention refers to an amount accounting for 2~9 wt % of the use proportion of the reaction. If the use proportion is less than 2 wt %, then emulsibility of the obtained copolymers is reduced, and bubbles easily occur. If the use proportion exceeds 9 wt %, then hydrophobicity of the copolymers becomes excessive, and poor emulsiblity results. Use proportion of the monomers B refers to 40~50 wt %. If the use proportion is less than 40 wt %, then emulsibility of the obtained copolymers is reduced, and if the use proportion exceeds 50 wt %, then hydrophilic properties of the copolymers becomes excessive, and performance of the obtained resin latex is reduced, in particular, water resistance is reduced.

The inorganic bases used in the present invention enable the reactive carboxylic acid monomers with carbon-carbon double bond polymerizable functional groups to have high hydrophilic and anion characteristics within a broad pH range, and causes hydrophilic ion radicals to form on the end groups of the oleophilic polymer molecular chains, with the result that charged layers are formed on the surfaces of the microspheres of the obtained latex colloidal particles, and stable latex is obtained which is provided with superior emulsibility properties. Although no particular restriction is set on the acid value, however, after neutralization, the acid value of the copolymer solid contents is normally preferably set at approximately 3.5~6.5 mg KOH/g.

Regarding the acrylic monomers used in the present invention, adhesiveness, emulsion viscosity or stability of the obtained aqueous acrylic latex are taken into consideration to determine the setting of each glass-transition temperature (Tg) within a specified range. Tg of the acrylic monomer constituents is set at 20~20° C., 5~10° C. being preferred.

The solid contents of the aqueous acrylic latex is preferably set at 40~50%, thereby easily controlling viscosity of the aqueous emulsion during manufacture, and increasing agglutination strength. Moreover, form of the obtained aqueous acrylic latex does not contain organic solvents.

Although there is no specific limitation on the acrylic monomers suitable for use in the method of the present invention, examples of the carboxylic acid monomers with carbon-carbon double bond polymerizable functional groups (A) include one type or more than one type selected and formed from a group including acrylic acid (hereinafter referred to as AAc), methacrylic acid (hereinafter referred to as MAAc), fumaric acid, itaconic acid (hereinafter referred to as ITA) and crotonic acid (hereinafter referred to as CTA).

Examples of methacrylate alkanes or acrylate alkane monomers B include one type or more than one type selected and formed from a group including methyl methacrylate (hereinafter referred to as MMA), ethyl methacrylate (EMA), n-butyl methacrylate (n-BMA), i-butyl methacrylate (i-BMA), t-butyl methacrylate (t-BMA), methyl acrylate (MA), ethyl acrylate (EA), n-butyl acrylate (hereinafter referred to as n-BA), i-butyl acrylate (hereinafter referred to as i-BA), t-butyl acrylate (t-BA), 2-ethyl hexyl acrylate (hereinafter referred to as 2-EHA), 2-ethyl hexyl methacrylate (2-EHMA), lauric methyl acrylate (LMA), acrylnitrile (AN), and methyl acrylnitrile (MAN). Moreover, depending on needs, can also combine monomers apart from acrylate monomers such as vinyl acetate, styrene.

The acrylic resin latex obtained by the method of the present invention has excellent storage stability, and has good heat resisting properties, adhesive strength, agglutination strength and coatability when compared with traditional methods. Moreover, because the resin latex does not contain organic solvents, thus, it is very suitable for use as coating from hygiene safety aspects. More particularly, it is suitable for use in building materials with strict standards regarding residual solvents in manufactured products requiring high heat resistance, adhesive strength and agglutination strength.

In the method of the present invention, because initiators initiate polymerization of the monomer molecules in water, thus, chain growth rate is relatively fast. When the molecular weight of the generated polymers reaches a certain critical value, that is precipitates out from the aqueous phase, then the initial latex particles are formed. Because the surface charge concentration of these particles is relatively low, thus, the static electricity repulsive force between the particles is insufficient, which causes the particles to be stable, thereby enabling mutual aggregation until stable latex particles are produced. Hydrophilic ion radicals are formed on the end groups of the oleophilic polymer molecular chains, and the generated esters are provided with the characteristics of an anionic emulsifier, achieving emulsification effectiveness without emulsifier, thereby providing the polymer esters obtained by polymerization with the characteristics of an anionic emulsifier, and emulsification effectiveness enabling emulsion polymerization to be carried out without emulsifier is achieved.

Examples of the organic amines used in the method of the present invention serving as pH regulators include ammonia (hereinafter referred to as NH$_4$OH), trimethyl amine (hereinafter referred to as TMA), diethylamine (DEA), triethylamine (TEA), monoethanolamine (hereinafter referred to as META), diethanolamine (DETA), dimethyl ethanolamine (hereinafter referred to as DMEA), dimethyl ethanolamine (DEEA), isopropyl ethanolamine (hereinafter referred to as IPEA), 2-amino-2-methyl propanol (AMP), 2-dimethylamino-2-methyl propanol (DMAMP), morpholine (MOR), n-methyl morpholine (NMR), and n-ethyl morpholine (NEM). In which ammonia, trimethyl amine, dimethyl ethanolamine and 2-amino-2-methyl propanol are preferred.

Latex colloidal particles prepared by emulsification polymerization using the method of the present invention are provided with surfaces having greater hydrophilic properties and better stability, and the synthesized polymer emulsion has particles of small average diameter, low surface tension, extremely strong wettability and permeability, and better stability.

Regarding the polymerization method for acrylic latex without emulsifier of the present invention, a reaction system formed from 40~60 wt % of pure water and 2~9 wt % of carboxylic acid monomers with carbon-carbon double bond polymerizable functional groups (A), 40~50 wt % of methyl alkyl acrylates or alkyl acrylates monomers (B) is added into a reactive tank, then the pH value of the reaction system is first adjusted to within the range 9.0~13.0 using 0.2~2.0 wt % of an inorganic alkaline solution, after which emulsification polymerization is carried out using 0.2~1.0 wt % of peroxide sulfate initiators. At the end of the reaction, organic amine compounds are used to adjust the pH value of the obtained aqueous resin latex to within the range 7.0~9.5. Particle diameter of the manufactured aqueous resin latex is approximately 100~130 nm, moreover, outward appearance of uniform distribution is excellent, has low acid value of 3.5~6.5 mgKOH/g, specific gravity is approximately 1.07, which is slightly greater than water, storage stability is superior, with good permeability that facilitates construction. Its water resisting property as a dry film coating is good, tensile strength is excellent, and provides superior abrasion performance.

Distilled water (the distilled water having first adding reactants accounting for 40~6 wt % of the polymerization reaction) is first measured out, and then stirring is begun at a rotating speed of approximately 150~300 rpm. After maintaining the temperature at 70~95° C., carboxylic acid monomers with carbon-carbon double bond polymerizable functional groups and inorganic alkaline solution are added, and initiators are added when a set temperature is reached after 20~30 minutes. Acrylic alkanes or methacrylate alkane monomers are then slowly instilled, the instillation being completed after 2.0~4.5 hours. Moreover, the temperature and rotating speed are maintained, and the reaction continued for approximately 2~3 hours. The heater is switched off, but stirring is continued to enable the temperature to naturally fall. When the temperature has fallen to 40° C., an organic amine pH regulator is diluted with water and then slowly added for approximately 15 minutes, thereby causing the pH value to reach 8.0~9.0. After completing the polymerization reaction, average particle diameter of the obtained aqueous acrylic latex is small (diameter d of the microspheres particles being 100~130 nm).

The latex colloidal particles prepared by the emulsification polymerization preparation method of the present invention are provided with surfaces having greater hydrophilic properties and better stability, and the synthesized polymer microemulsion has uniform average particle diameters, strong wettability and permeability and better stability. The method of the present invention has researched into how emulsion polymerization can be achieved without emulsifier, which can be basically attributed to the effective synthesis of polymer particles having uniform particle diameter, and is normally applicable to heteropolymerization reactions. Heteropolymerization includes emulsification polymerization using water to serve as the solvent or dispersion polymerization using organic liquids as the solvent. Because of the addition of a large amount of dispersing agents such as soap or macromolecular stabilizing agents, all situations result in after-treatment problems after synthesis or problems of impurities remaining in the resultant. Each synthesis method has its specific characteristics which are difficult to substitute, and there is an essential need to expand development of these characteristics. To avoid the problems brought about by emulsifier participation in the reaction, the method of the present invention does not add any emulsifier whatsoever during the reaction process. Instead, 0.2~2 wt % of inorganic alkaline solution is first added to the reaction system formed by 40~60 wt % of pure water and 2~9 wt % of carboxylic acid monomers with carbon-carbon double bond polymerizable functional groups (A) and 40~50 wt % of methacrylate alkanes or acrylate alkane monomers (B) to adjust the pH value of the reaction system to within the range 0.0~13.0, thereby providing characteristics of a high polymer emulsifier. After which, peroxide sulfates are used as initiators to carry out emulsification polymerization. At the end of the reaction, organic amine compounds are used to adjust the pH value of the obtained aqueous resin latex to within the range 7.0~9.5. Accordingly, uniformly dispersed latex particles are obtained with clean surfaces, while at the same time avoiding the use of emulsifiers that affect the environment.

Recent years has seen an upsurge in environment problems, and from the viewpoint of biomedical technology related applications or development of various types of functional materials, there is the anticipation for the development of environment friendly manufacturing processes or the development of synthesis methods for high-purity polymer particles.

The synthesis aspect of so-called monodispersed particles of uniform particle diameter involves emulsification polymerization without emulsifier, in which such a polymerization method uses water as the solvent, and has the characteristics of being a pure manufacturing process without the addition of soaps. Hence, the polymerization system is simple and pure, the environment being formed from monomers, initiators and water. In general, the major problem of particle syntheses normally lies in controlling the range of particle diameters, and the polymerization method without emulsifier of the present invention enables obtaining an emulsion of particle diameters of 100~130 nm which are uniformly distributed, and the anticipated control of the range of particle diameters has been further expanded.

For a long time, polymerization without emulsifier has been intended for application in non-environment polluting applications such as adhesive agents, binding agents, the printing ink industry, and so on. Furthermore, monodispersed particles with clean surfaces are used to serve as mould particles for colloid research or as standard particles for correction use of electronic microscopes. However, the realm of applicable particle diameters is below submicron, and synthesis of particles having diameter exceeding this size is relatively difficult. On the other hand, there has been a broadening of the use of micron sized monodispersed particles in recent years, and examples of application include use in high value added products, such as liquid crystal spacers, conductive particles, medical check-up supporters, fillers for analytical use, and copying machine toners. The emulsification polymerization method without emulsifier of the present invention is also able to synthesize nanometer sized mondispersed particles, in which the average particle diameter of the obtained aqueous acrylic latex is small (particle diameter d of the microspheres being 100~130 nm), which has anticipated applications in the aforementioned fields.

To enable a further understanding of said objectives and the technological methods of the invention herein, a brief description of the drawings is provided below followed by a detailed description of the preferred embodiments.

Testing Methods

Physical Properties of Latex

1. Average Particle Diameter D, Particle Diameter Distribution and Standard Deviation (Sd), Dispersion Coefficient D Laser diffractometry on the obtained emulsion polymer was carried out using a MASTERSIZER-2000 manufactured by MANERN Corporation to obtain a microsphere particle diameter distribution curve. The average particle diameter d was measured, and using the particle diameter distribution and standard deviation (sd), the dispersion factor D was calculated according to the following equation: D=sd/d. The microsphere particle diameter distribution curve from the obtained emulsion polymer enables directly obtaining the distributed condition of the microsphere particle diameters.

2. Glass Transition Temperature Tg (° C.)

The Tg points were measured using a differential scanning calorimeter (DSC) manufactured by METTLER-TOLEDO Instrument Company.

3. Acid Value

The manufactured emulsion was tested according to the method stipulated in Part 2, Section 1 of K5601 of the Japanese Industrial Standards (JIS).

4. Specific Gravity

Samples of the manufactured emulsion were prepared and tested according to the method K7232 stipulated in the Japanese Industrial Standards (JIS).

5. pH Value

Samples of the manufactured emulsion were prepared and tested according to the method stipulated in Part 2, Section 10 of K040 of the Japanese Industrial Standards (JIS).

6. Storage Stability

Samples of the manufactured emulsion were prepared and tested according to the method stipulated in Part 2, Section 7 of K5600 of the Japanese Industrial Standards (JIS).

7. Freezing Stability

Samples of the manufactured emulsion were prepared and tested according to the method stipulated in Part 2, Section 7 of K5600 of the Japanese Industrial Standards (JIS).

Physical Properties of Latex Film Coating

1. Tensile Strength

Samples of the manufactured emulsion were prepared and tested according to the method K6251 stipulated in the Japanese Industrial Standards (JIS).

2. Tear Strength

Samples of the manufactured emulsion were prepared and tested according to the method K6252 stipulated in the Japanese Industrial Standards (JIS).

3. Extensibility

Samples of the manufactured emulsion were prepared and tested according to the method K6251 stipulated in the Japanese Industrial Standards (JIS).

4. Hardness of Film Coating

Samples of the manufactured emulsion were prepared and tested according to the method K6253 stipulated in the Japanese Industrial Standards (JIS).

5. Water Absorption Over Three Days

Samples of the manufactured emulsion were prepared and tested according to the method K7112 stipulated in the Japanese Industrial Standards (JIS).

Operating Performance of Latex

Mixing properties, adherence and recoatability with sand aggregates (CA-400) of the manufactured emulsion were observed according to the method A1181 stipulated in the Japanese Industrial Standards (JIS). X represents excellent results, and X represents poor results.

As for electrolyte stability, tests were carried out according to the method stipulated in Section 2 of K6935 of the Japanese Industrial Standards (JIS).

DETAILED DESCRIPTION OF THE PREFERRED EMBODIMENTS

Embodiments 1~5

The carboxylic acid monomers used in embodiments 1~3 are all monocarboxylic acids with carbon-carbon double bond polymerizable functional groups, but different inorganic bases are used.

Embodiments 4~5 use a mixture of monocarboxylic acids with carbon-carbon double bond polymerizable functional groups and different dicarboxylic acids with carbon-carbon double bond polymerizable functional groups.

Basic composition and emulsion properties, film coating properties and emulsion operating performance of the obtained aqueous acrylic latex are as depicted in Table 1.

Comparative Examples 1~4

The acid value of aqueous acrylic latex of the prior art is normally higher compared to the aqueous acrylic latex obtained by using the method of the present invention, and even if the acid value of aqueous acrylic latex of the prior art is lower or similar to the aqueous acrylic latex obtained by using the method of the present invention, however, emulsifiers are used in the emulsion polymerization. For the purpose of comparison, aqueous acrylic latex having an acid value higher than that of the present invention was used as comparative examples 1~2, and an aqueous acrylic latex having an acid value lower than that obtained by the present invention with a conventional emulsifier CMC (12R) being used to carry out emulsion polymerization served as comparative examples 3~4. Basic composition and emulsion properties, film coating properties and emulsion operating performance are as depicted in Table 2.

Embodiments 1~5 based on the basic compositions depcited in Table 1.

(1) 0.2~2.0 wt % of inorganic alkaline solution and a measured amount of distilled water (distilled water having first added reactants accounting for 40~60 wt % of the polymerization reaction) are added into a reactive tank, and then stirring is started at a rotating speed of approximately 150~300 rpm, with the temperature maintained at 70~95° C.

(2) Carboxylic acid monomers (A), such as acrylic acid, methacrylic acid or butenic acid and itaconic acid monomers (accounting for approximately 2~9 wt % of total monomers) are added.

(3) After approximately 20 minutes when a set temperature has been reached, 0.2~1.0 wt % of peroxide sulfate initiators are added, after which alkyl acrylates monomers (B), such as methyl methacrylate, ethyl methacrylate. i-butyl methacrylate, t-butyl methacrylate, methyl acrylate, n-butyl acrylate, 2-ethyl hexyl methacrylate (accounting for approximately 40~50 wt % of total monomers) are slowly added dropwise, the dropwise addition being completed in 2.0~4.5 hours, the temperature being maintained and the rotating speed continued for appropriately 2~3 hours.

Figure 1:
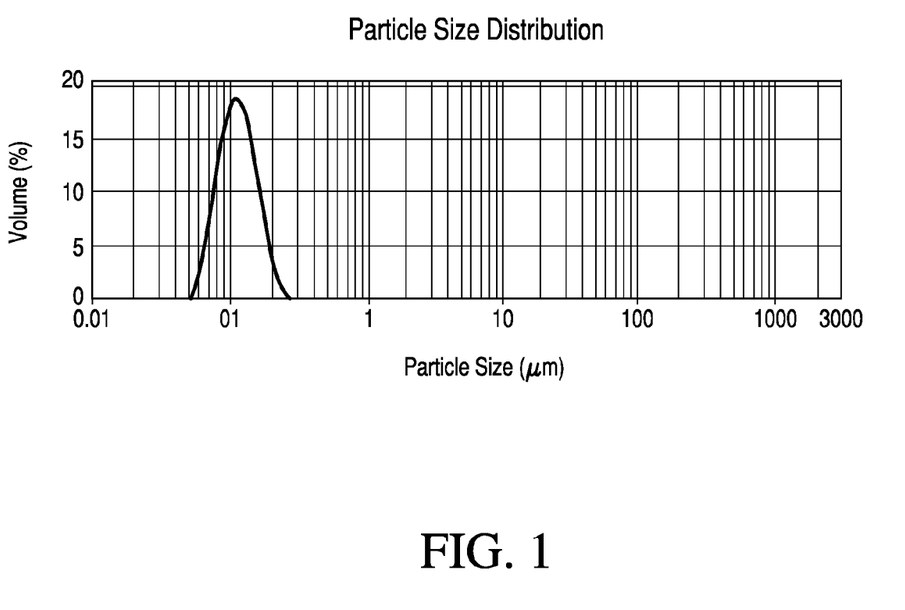
FIG. 1 relates to a polymerization method for acrylic latex without emulsifier of the present invention, which shows a distribution curve of particle diameters of microspheres of emulsion polymers obtained by embodiments 1~5 and distribution condition of directly obtained particle diameters of microspheres.
Figure 2:
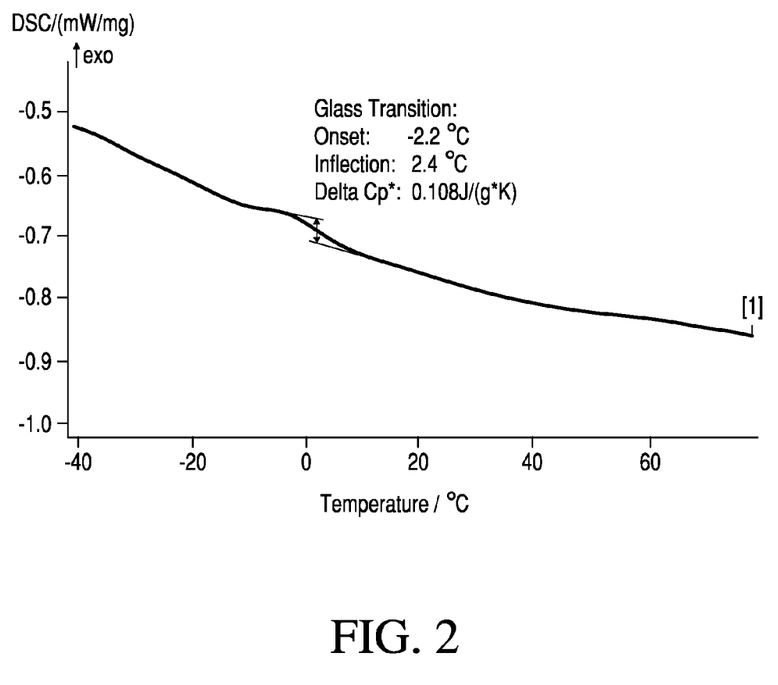
FIG. 2 relates to a polymerization method for acrylic latex without emulsifier of the present invention, in which METTLER-TOLEDO Differential scanning calorimeters (DSC) were used to measure Tg (glass transition temperatures) points of emulsion polymers obtained by embodiment 1.

(4) The heater is switched off, but stirring continued to allow the temperature to fall naturally. After the temperature has dropped to 40° C., the pH regulators are diluted with water and then slowly added for approximately 15 minutes, thereby causing the pH value to reach 8~9. The reaction is ended, and the aqueous acrylic latex obtained. Constituents and properties of the obtained acrylic aqueous acrylic latex and dry film coating are as depicted in Table 1. Moreover, the distribution condition of the particle diameters of the microspheres can be directly obtained from the obtained particle diameter distribution curve of the polymer microspheres, the graph being as depicted in FIG. 1.

Operating Performance of Latex 68.2 wt % of acrylic resin without emulsifier obtained from embodiments 1~5 was combined with sand aggregates, such as 11.4 wt % of concrete, silica sand, and the like, together with various types of 11.4 wt % of powder fillers, and 6.8 wt % of pigment to manufacture sheet material products to check mixing properties, adherence and recoatability.

Comparative Examples 1~4

Based on the basic compositions as depicted in Table 2, aqueous acrylic latex was synthesized using the same method as embodiments 1~5, the constituents and properties of the obtained acrylic aqueous acrylic latex and dry film coating are as depicted in Table 2.

TABLE 1

Latex composition, physical properties of latex, operating performance latex and physical properties of film coating of embodiments

| | | | | Embodiment No. | | | | |
|---|---|---|---|---|---|---|---|---|
| | | | | 1 | 2 | 3 | 4 | 5 |
| Basic Composition | Alkaline solution (wt %) | | | NaOH (0.2) | KOH (0.3) | $Na_3PO_4$ (1.1) | KOH (0.4) | NaOH (0.3) |
| | Distilled water (wt %) | | | 52.3 | 52.2 | 49.5 | 48.8 | 52.3 |
| | Ph value after mixing alkaline solution & distilled water | | | 11.7 | 12.1 | 11.9 | 12.3 | 11.9 |
| | initiator (wt %) | | | $Na_2S_2O_8$ (0.4) | $K_2S_2O_8$ (0.2) | $K_2S_2O_8$ (0.3) | $(NH_4)_2S_2O_8$ (0.4) | $(NH_4)_2S_2O_8$ (0.7) |
| | Monomer | (B) | B1 | MMA | MMA | MMA | MMA | MMA |
| | | | (wt %) | (17.8) | (16.5) | (21.0) | (20.6) | (16.6) |
| | | | B2 | n-BA | 2-EHA | 2-EHA | n-BA | 2-EHA |
| | | | (wt %) | (21.3) | (23.2) | (19.2) | (22.3) | (23.2) |
| | | (A) | A1 | AAc | MAAc | AAc | MAAc | AAc |
| | | | (wt %) | (3.4) | (3.9) | (4.3) | (2.7) | (3.2) |
| | | | A2 | — | — | — | CTA | ITA |
| | | | (wt %) | | | | (1.1) | (0.7) |
| | pH regulator (wt %) | | | TMA | $NH_4OH$ | DMEA | AMP | DMEA |
| | $H_2O$ (wt %) | | | 1.6) 2.1 | (1.2) 2.5 | (0.6.) 4.0 | (0.8) 2.9 | (0.8) 2.2 |
| Latex properties | Av. Particle diameter d (nm) | | | 114 | 113 | 114 | 116 | 113 |
| | Glass transition temp. Tg(° C.) | | | 2.40 | −3.49 | 8.48 | 7.22 | −9.00 |
| | Solid content (%) | | | 45.6 | 45.3 | 46.5 | 48.3 | 45.5 |
| | Acid value mg KOH/g | | | 4.1 | 4.5 | 5.7 | 4.8 | 5.2 |
| | Specific gravity | | | 1.05 | 1.06 | 1.07 | 1.07 | 1.06 |
| | pH value | | | 8.66 | 8.52 | 8.55 | 8.72 | 8.12 |
| | Storage stability (0° C.~45° C.) | | | ◎ | ◎ | ◎ | ◎ | ◎ |
| | Freezing stability (repeated thawing 6 times) | | | ◎ | ◎ | ◎ | ◎ | ◎ |
| Film coating properties | Tearing strength (kgf/cm) | | | 13.2 | 13.2 | 13.5 | 12.5 | 16 |
| | Tensile strength (kgf/cm$^2$) | | | 28.5 | 26.4 | 26.4 | 26.5 | 33.6 |
| | Extensibility (%) | | | 340 | 320 | 390 | 380 | 280 |
| | Hardness (Shore hardness A) | | | 85 | 81 | 88 | 86 | 78 |
| | 3-day water absorption (%) | | | 3.98 | 4.01 | 3.44 | 3.59 | 3.97 |
| Latex operating performance | Mixing properties with sand aggregates | | | ◎ | ◎ | ◎ | ◎ | ◎ |
| | Adherence properties | | | ◎ | ◎ | ◉ | ◉ | ◎ |
| | Recoatability | | | ◎ | ◎ | ◎ | ◎ | ◎ |
| | Electrolyte stability | | | ◎ | ◎ | ◉ | ◉ | ◎ |

TABLE 2

Aqueous acrylic latex constituents and physical properties for comparative use

| | | Embodiment No. | | | |
|---|---|---|---|---|---|
| | | 1 | 2 | 3 | 4 |
| Basic Composition | Alkaline solution (wt %) | KOH (0.6) | NaOH (0.5) | Na3PO4 (1.3) | NaOH (0.4) |
| | Distilled water (wt %) | 48.4 | 48.5 | 44.2 | 44.7 |
| | Ph value after mixing alkaline solution & distilled water | 12.6 | 12.5 | 12.1 | 12.3 |
| | Emulsifier (CMC) (wt %) | — | — | 1.6 | 2.0 |

TABLE 2-continued

Aqueous acrylic latex constituents and physical properties for comparative use

|  |  |  |  | Embodiment No. | | | |
|---|---|---|---|---|---|---|---|
|  |  |  |  | 1 | 2 | 3 | 4 |
|  | Initiator (wt %) |  |  | $K_2S_2O_8$ (0.4) | $Na_2S_2O_8$ (0.4) | $K_2S_2O_8$ (0.5) | $K_2S_2O_8$ (0.5) |
|  | Monomer | (B) | B1 (wt %) | MMA (13.9) | MMA (10.7) | MMA (19.0) | MMA (19.0) |
|  |  |  | B2 (wt %) | 2-EHA (20.5) | 2-EHA (23.0) | n-BA (27.0) | n-BA (27.0) |
|  |  | (A) | A1 (wt %) | AAc (12.2) | MAAc (12.5) | AAc (2.6) | MAAc (2.6) |
|  |  |  | A2 (wt %) | — | — | — | — |
|  | pH regulator (wt %) |  |  | TMA (1.6) | DMEA (1.7) | $NH_4OH$ (1.4) | AMP (1.4) |
|  | $H_2O$ (wt %) |  |  | 2.4 | 2.7 | 2.4 | 2.4 |
| Latex properties | Av. Particle diameter d (nm) |  |  | 115 | 115 | 166 | 176 |
|  | Glass transition temp. Tg(° C.) |  |  | 5.00 | 8.05 | −5.28 | −2.95 |
|  | Solid content (%) |  |  | 49.2 | 48.8 | 53.4 | 52.9 |
|  | Acid value mg KOH/g |  |  | 10.8 | 9.8 | 5.9 | 5.7 |
|  | Specific gravity (theoretical value) |  |  | 1.09 | 1.09 | 1.06 | 1.06 |
|  | pH value |  |  | 8.01 | 8.66 | 8.52 | 8.52 |
|  | Storage stability (0° C.~45° C.) |  |  | X | X | ◎ | ◎ |
|  | Freezing stability (repeated thawing 6 times) |  |  | X | X | ◎ | ◎ |
| Film coating properties | Tearing strength (kgf/cm) |  |  | 10.2 | 11.2 | 10.8 | 10.8 |
|  | Tensile strength (kgf/cm$^2$) |  |  | 21.5 | 23.5 | 22.4 | 22.4 |
|  | Extensibility (%) |  |  | 210 | 210 | 200 | 200 |
|  | Hardness (Shore hardness A) |  |  | 83 | 87 | 78 | 81 |
|  | 3-day water absorption (%) |  |  | 9.5 | 9.8 | 10.1 | 10.5 |
| Latex operating performance | Mixing properties with sand aggregates |  |  | ◎ | ◎ | X | X |
|  | Adherence properties |  |  | X | X | X | X |
|  | Recoatability |  |  | X | X | X | X |
|  | Electrolyte stability |  |  | ◎ | ◎ | ◎ | ◎ |

Regarding the aqueous acrylic latex manufactured using the method of the present invention, from Table 1 the difference can be seen in the relatively low glass transition temperature (−9.00° C.) of embodiment 5 and the relatively high glass transition temperature (8.48° C.) of embodiment 3, but the requirements for physical properties of film coating products can be accommodated and prepared accordingly for use therewith. The degree of hardness of aqueous acrylic latex dry film from embodiment 3 is relatively hard, and is thus suitable for use with coating material for surface coating thereof. Film coating of the aqueous acrylic latex manufactured using the method of the present invention has relatively high physical properties and relatively low water-absorption, and thus suitable for use in all types of waterproofing works of buildings.

Regarding the aqueous acrylic resin latex obained by the method of the present invention, regardless of whether carboxylic acid monomers (A) used are monocarboxylic acids and/or dicarboxylic acids with carbon-carbon double bond polymerizable functional groups, different inorganic alkaline solutions can be used to carry out emulsion polymerization without emulsifier. The storage stability and freezing stability of the manufactured aqueous acrylic latex are good, and is suitable for use in various types of operating environments. Moreover, because the aqueous acrylic latex does not contain organic solvents, use as a coating material is suitable from safety and hygienic viewpoints. More particularly, it is suitable for use in building materials with strict standards regarding residual solvents in manufactured products requiring strong adhesion force and high mechanical strength.

The acid values of the emulsion obtained from comparative examples 1~2 using an excessive amount of carboxylic acids are high, which causes water absorption to rise. Although the comparative examples 1~2 enable obtaining emulsion with average particle diameter of 115 nm, however, storage stability and freezing stability are poor. And although mixing property thereof with sand aggregate is good, however, adherence and recoatability are inferior, and are not suitable for use in various types of operating environments. Regarding emulsions having acid values lower than the acid values of embodiments 3~4 and similar to emulsions obtained by the present invention, although the storage stability and freezing stability of the obtained emulsions are good. However, using the conventional emulsifier CMC (12R) to carry out emulsion polymerization, particle diameter of the obtained emulsion is enlarged and water-absorption over three days of the film coating rises. Moreover, mixing property, adherence and recoatability with sand aggregate is poor, and thus not suitable for various types of operating environments.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A polymerization method for acrylic latex without emulsifier, comprising the following steps (1)-(4):
   (1) preparing a reaction system comprising 40 to about 58 wt % of pure water, 2-9 wt % of carboxylic acid monomer A with carbon-carbon double bond polymerizable functional groups, and 40-50 wt % of methacrylate alkane or acrylate alkane monomer B;

(2) adjusting the pH of the reaction system of step (1) to within a pH range of 9.0-13.0 by adding 0.2-2 wt % of an inorganic alkaline solution;

(3) obtaining an aqueous resin latex by adding 0.2-1.0 wt % of an initiator of emulsification polymerization to the reaction system of step (2), maintaining the reaction system at a temperature of 70-95° C. and stirring the reaction system at a rotating speed of 150-300 rpm, wherein the initiator of emulsification polymerization is a persulfate selected from the group consisting of sodium persulfate, potassium persulfate, ammonium persulfate, and any combination thereof; and (4) adjusting the pH value of the aqueous resin latex of step (3) to within a pH range of 7.0-9.5 by adding an organic amine selected from the group consisting of trimethyl amine, monoethanolamine, dimethyl ethanolamine, 2-amino-2-methyl propanol, and any combination thereof, thereby obtaining an ultra-thin aqueous acrylic polymer of uniformly distributed particles having a diameter of 100-130 nm.

2. The polymerization method for acrylic latex without emulsifier according to claim 1, wherein the carboxylic acid monomer A with carbon-carbon double bond polymerizable functional groups is selected from the group consisting of acrylic acid, methacrylic acid, itaconic acid, crotonic acid, and any combination thereof.

3. The polymerization method for acrylic latex without emulsifier according to claim 1, wherein the methacrylate alkane or acrylate alkane monomer B is selected from the group consisting of methyl methacrylate, ethyl methacrylate, n-butyl methacrylate, i-butyl methacrylate, t-butyl methacrylate, methyl acrylate, ethyl acrylate, n-butyl acrylate, i-butyl acrylate, t-butyl acrylate, 2-ethyl hexyl acrylate, 2-ethyl hexyl methacrylate, lauric methyl acrylate, acrylnitrile, methyl acrylnitrile, and any combination thereof.

4. The polymerization method for acrylic latex without emulsifier according to claim 1, wherein the inorganic alkaline solution is selected from the group consisting of sodium hydroxide, potassium hydroxide, trisodium phosphate, and any combination thereof.

* * * * *

UNITED STATES PATENT AND TRADEMARK OFFICE
CERTIFICATE OF CORRECTION

PATENT NO. : 8,575,265 B2  
APPLICATION NO. : 13/067902  
DATED : November 5, 2013  
INVENTOR(S) : Der-Jang Liaw et al.

Page 1 of 1

It is certified that error appears in the above-identified patent and that said Letters Patent is hereby corrected as shown below:

On the Title Page:

Item "(75) inventors: Der-Jang Liaw, Tai-Chung (TW);
Chih-Kuang Hu, Tai-Chung (TW);
Chih-Wei Chang, Tai-Chung (TW)"

should read:

Item --(75) Inventors: Der-Jang Liaw, Tai-Chung (TW);
Chi-Kuang Hu, Tai-Chung (TW);
Chih-Wei Chang, Tai-Chung (TW)--

Signed and Sealed this
Eleventh Day of February, 2014

Michelle K. Lee
*Deputy Director of the United States Patent and Trademark Office*